United States Patent [19]

Ong et al.

[11] Patent Number: 5,316,555
[45] Date of Patent: May 31, 1994

[54] MOLTEN CARBONATE FUEL CELL ELECTROLYTE TOUGHENING

[75] Inventors: Estela T. Ong, Chicago; Kenneth E. Hrdina, Glenview, both of Ill.

[73] Assignee: Institute of Gas Technology, Chicago, Ill.

[21] Appl. No.: 970,563

[22] Filed: Nov. 3, 1992

[51] Int. Cl.$^5$ .................................... H01M 27/20
[52] U.S. Cl. .................... 29/623.1; 429/12; 429/16
[58] Field of Search ............. 429/12, 16; 29/623.1

[56] References Cited

U.S. PATENT DOCUMENTS

| | | | |
|---|---|---|---|
| 3,615,845 | 10/1971 | Gray | 136/86 |
| 3,878,296 | 4/1975 | Vine et al. | 423/600 |
| 4,057,678 | 11/1977 | Walker, Jr. | 429/104 |
| 4,079,171 | 3/1978 | Marianowski et al. | 429/46 |
| 4,115,632 | 9/1978 | Kinoshita et al. | 429/188 |
| 4,216,278 | 8/1980 | Arendt et al. | 429/188 |
| 4,389,467 | 6/1983 | Singh et al. | 429/41 |
| 4,480,017 | 10/1984 | Takeuchi et al. | 429/38 |
| 4,538,348 | 9/1985 | Vine et al. | 29/623.1 |
| 4,542,079 | 9/1985 | Takeuchi et al. | 429/39 |
| 4,554,225 | 11/1985 | Sounai et al. | 429/34 |
| 4,581,302 | 4/1986 | Vine et al. | 429/12 |
| 4,656,735 | 4/1987 | Okada et al. | 29/623.1 |
| 4,663,250 | 5/1987 | Ong et al. | 429/16 |
| 4,710,436 | 12/1987 | Nakamura et al. | 429/41 |
| 4,714,661 | 12/1987 | Kaun et al. | 429/14 |
| 4,761,348 | 8/1988 | Kunz et al. | 429/35 |
| 4,780,437 | 10/1988 | Smith | 502/101 |
| 4,781,996 | 11/1988 | Toriya et al. | 429/36 |
| 4,859,292 | 8/1989 | Appleby | 204/60 |
| 4,921,765 | 5/1990 | Gmeindl et al. | 429/16 |
| 4,992,341 | 2/1991 | Smith et al. | 429/40 |

OTHER PUBLICATIONS

"Mechanical Properties of Silicon Carbide Whisker-/Aluminum Oxide Matrix Composites", Vaughn, Wallace L., Homeny, Joseph, and Ferber, Mattison K., Ceram. Eng. Sci. Proc., 8 [7–8], pp. 848∝859, (1987).

*Primary Examiner*—Marianne M. Cintins
*Assistant Examiner*—Catherine S. Kilby Scalzo
*Attorney, Agent, or Firm*—Speckman, Pauley & Fejer

[57] ABSTRACT

A porous matrix of lithium aluminate particles for molten alkali metal carbonates electrolytes having about 5 to about 50 volume percent, based upon the volume of the solids, of electrically non-conductive, active electrolyte compatible fibers having an average diameter of about 1 to about 50 microns and an average length greater than about 5 times the average diameter. Such matrices reduce matrix cracking upon loading with molten carbonates active electrolyte and provide high surface area over long term fuel cell operation.

22 Claims, 5 Drawing Sheets

MOLTEN CARBONATE FUEL CELL ELECTROLYTE TOUGHENING

BACKGROUND OF THE INVENTION

1. Field of the Invention

This invention relates to toughening the matrix portion of molten alkali metal carbonates electrolyte during impregnation with active electrolyte and to providing high matrix surface area under fuel cell operating conditions resulting in stable long term fuel cell operation. The toughening is achieved by both crack deflection and resistance to fiber pullout by inclusion of electrically non-conducting, electrolyte compatible fibers within the matrix.

2. Description of Related Art

Various attempts have been made to reinforce the matrix portion of molten alkali metal carbonates electrolytes to obtain higher electrical output over longer periods of time. U.S. Pat. No. 4,079,171 teaches reinforcement of lithium aluminate electrolyte matrices with about 2 to about 6 volume percent, preferably about 2 to about 4 volume percent, of a metallic alloy containing principally iron, chromium and about 2 to about 6 weight percent aluminum, in the form of fine screens, woven mesh, expanded sheets, fibers or particles, specifically disclosing use of Kanthal fibers 0.005 inch in diameter and 0.5 inch long. U.S. Pat. No. 4,216,278 contains similar disclosure, specifically disclosing use of Kanthal wire mesh ($20\times20$ wires inch$^{-1}$, 0.005 inch diameter wire) pressed into a lithium aluminate electrolyte matrix.

U.S. Pat. Nos. 4,538,348 and 4,581,302 disclose molten carbonate fuel cell matrices having about 5 to about 30 volume percent of corrosion resistant ceramic particulate material functioning primarily for crack attenuation. These particulate materials have an average size range greater than about 25 microns, preferably greater than about 50 microns, of the same material as the less than 1 micron sized inert particulates making up the major portion of the matrix, or of a more reactive material, such as alumina due to less reactivity of the large particle size.

The mechanical properties of silicon carbide whisker-/aluminum oxide matrix composites having 30 volume percent silicon carbide whiskers having an average diameter in the sub-micron range and an average length in the order of about 10 to 30 microns is described in Vaughn, Wallace L., Homeny, Joseph, and Ferber, Mattison K., "Mechanical Properties of Silicon Carbide Whisker/Aluminum Oxide Matrix Composites" Ceram. Eng. Sci. Proc., 8 (7-8), pp. 848-859, (1987).

SUMMARY OF THE INVENTION

The production of molten carbonates matrix tapes for use in fuel cells by spreading a suspension of $LiAlO_2$ particles in a slurry containing organic solvents, an organic binder, and slurry aids to form tapes from which the organic materials are vaporized has resulted in cracking of the matrix during high temperature active electrolyte impregnation. The present invention greatly reduces the tendency for cracking in the described type of electrolyte matrix upon active electrolyte impregnation.

Another problem which arises with electrolyte matrices of the type described under higher temperature fuel cell operation conditions is that the $LiAlO_2$ particles grow decreasing matrix surface area which decreases its active electrolyte holding capacity. The present invention results in maintenance of the desired high surface area of the electrolyte matrix, and even shows significant increase in matrix surface area following long time fuel cell operation.

Molten carbonate fuel cell electrolytes of this type have also exhibited cracking during large temperature variations as occurs during fuel cell thermal cycling. In practical operation, electrolyte structures must withstand repeated thermal cycling without developing large cracks. Small cracks may be tolerated since they have a tendency heal upon remelting of the electrolyte.

This invention provides molten carbonate fuel cell lithium aluminate particulate electrolyte matrix toughening, which includes both crack deflection and resistance to fiber pullout, sufficient to retain good matrix structure during active electrolyte impregnation and to maintain or increase lithium aluminate matrix high surface area and to provide decreased matrix cracking upon thermal cycling. These features enhance fuel cell operation and stability over long periods of high temperature and thermal cycling operation.

The electrolyte matrix toughening against fracture and maintenance of high surface area during fuel cell operation is achieved according to this invention by incorporation into the electrolyte matrix of about 5 to about 50 volume percent, based upon the volume of the solids, of electrically nonconductive, active electrolyte compatible, easily wettable fibers having an average diameter of about 1 to about 50 microns and having an average length greater than about 5 times the average diameter. Use of electrically nonconductive fibers is important to this invention allowing high concentrations of the fibers, especially longer fibers, without causing electrical short circuits across the electrolyte which results from use of metallic materials. The fibers used in this invention must also be resistant to chemical action by the very corrosive action of the active molten alkali metal carbonates electrolyte under high temperature fuel cell operating conditions. Silicon carbide, for example, is not stable in the molten carbonate fuel cell environment.

The toughening obtained by this invention is a microstructure strengthening of the electrolyte matrix and different from prior attempts of mechanical reinforcing by use of mesh or arresting of cracks by particles. Fracture toughness is provided in the electrolyte matrix structure of this invention by crack deflection, that is cracks being attracted by the micro-fibers and propagating parallel or at right angles to them, and by the resistance to fiber pullout, that is the shear resistance of the fiber/matrix interface. Wake toughening, related to fiber pullout, occurs when fibers bridge across crack faces in the wake region of an extending crack providing further electrolyte matrix toughening. This combination of fracture toughness cannot be provided by particles previously used in attempts to provide stable molten carbonate fuel cell electrolytes.

BRIEF DESCRIPTION OF THE DRAWINGS

The above and further advantages of this invention are better understood by reading of the following preferred embodiments with reference to the drawings wherein.

DESCRIPTION OF PREFERRED EMBODIMENTS

Figure 1:
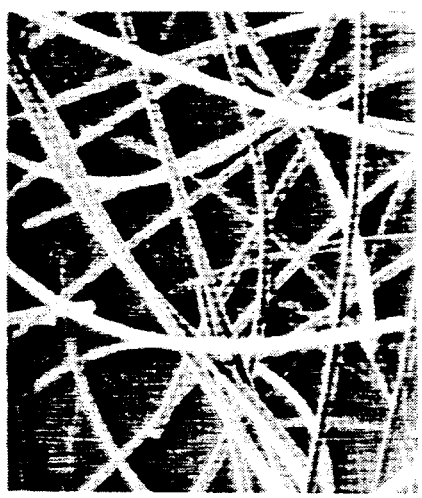
FIG. 1 is an electron micrograph of alumina fibers.
Figure 2:
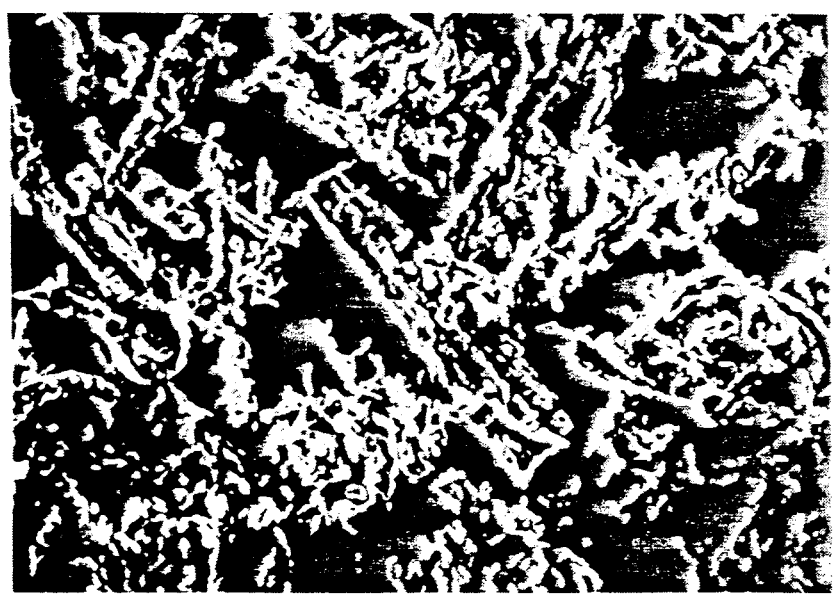
FIG. 2 is an electron micrograph of lithium aluminate fibers.

Molten carbonate fuel cell electrolyte matrix toughening according to this invention involves incorporation into the electrolyte matrix about 5 to about 50 volume percent, preferably about 10 to about 30 volume percent, based upon the volume of solids, of electrically nonconductive, electrolyte compatible fibers having an average diameter of about 1 to about 50 microns and having an average length greater than about 5 times the average diameter. In preferred embodiments, electrically nonconductive ceramic fibers have average diameters of about 1 to about 30 microns and average lengths greater than about 10 and up to about 500, most preferably about 40 to about 100, times the average diameter. Less than about 5 volume percent fibers and fibers both significantly smaller and larger than the above sizes are not desirable since they do not provide the desired electrolyte toughening. Suitable electrically nonconducting and active electrolyte compatible fiber materials for use in molten carbonate fuel cell electrolyte matrices of, for example, lithium aluminate, include alumina preferably of the alpha or delta form, and lithium aluminate. Alumina fibers, principally $\alpha$-alumina with a minor amount of $\delta$-alumina, are available from Imperial Chemical Industries (ICI) under the name Saffill having a density of 3.3 to 3.5 g/cm$^3$, strength 1-2 Mpa, modulus 300-330 Gpa, 3 $\mu$m diameter, 150 $\mu$m length. FIG. 1 shows the smooth, uniform 3 $\mu$m diameter fibers of the Saffill alumina fibers. Alumina fibers, principally $\alpha$-alumina, are available from DuPont under the designation FP having a density of 3.9 g/cm$^3$, strength 1.38 Mpa, modulus 380 Gpa, 20 $\mu$m diameter and in continuous lengths. Other alumina fibers are available. The alumina forms stable lithium aluminate products under molten alkali metal carbonates fuel cell operating conditions. Lithium aluminate fibers, $\gamma$-lithium aluminate, are available as experimental materials from Cyprus Foote Minerals and have diameters of 35-40 $\mu$m and lengths of 30-1000 $\mu$m. FIG. 2 shows the irregular shapes with wide range of lengths of the lithium aluminate fibers. The fibers are preferably in a random orientation and are of random lengths to provide the best toughening effects. Networks of such fibers distribute stresses over large volumes and thereby strengthen the structure in a manner which cannot be achieved by particles.

Prior electrolyte matrices for molten alkali metal carbonates fuel cells have been fabricated by suspending very fine lithium aluminate particles about 0.05 to about 100 microns, preferably homogeneous fine particles about 0.05 to about 1 micron or fine and coarse particles about 10 to about 100 microns, in a liquid vehicle containing organic solvents, plastic binder and additives providing desired slurry properties. The slurry is formed into a tape by spreading onto a flat surface with a doctor blade and the solvent is evaporated resulting in a flexible dried tape of lithium aluminate particles bonded together by the plastic binder. Upon further heating, the plastic binder is decomposed and vaporized resulting in a porous structure of lithium aluminate particles. At a subsequently higher temperature, molten carbonate active electrolyte is impregnated into the pores of the matrix resulting in the complete electrolyte structure. It is during heating to the temperature necessary to maintain the carbonate active electrolyte in molten fluid condition for impregnation, that such matrices are especially susceptible to cracking.

The electrolyte matrix according to this invention may be easily fabricated by conventional techniques, such as tape casting, as described above, by adding the desired fiber after the aluminate powder has been dispersed. The process for production of a porous matrix for molten alkali metal carbonates electrolytes according to this invention comprises forming a slurry of fine lithium aluminate particles and about 5 to about 50 volume percent, based upon the volume of the solids, electrically non-conductive, active electrolyte compatible fibers having an average diameter of about 1 to about 50 microns and having an average length greater than about 5 times the average diameter in a liquid vehicle with an organic binder, followed by tape casting the slurry, and heating the tape to vaporize the vehicle and decompose and vaporize the binder. The heating is preferably performed in the fuel cell and the active carbonates electrolyte loaded into the matrix in the fuel cell. This invention also provides a process for reducing cracking of tape cast electrolyte matrices during loading with active molten carbonates electrolyte by use of the above produced matrix tape. This invention further provides a process for preventing decrease in surface area of electrolyte matrix during molten alkali metal carbonates fuel cell operation by use of the above produce matrix tape.

The following examples are set forth using specific materials and conditions and should not be considered to limit the invention in any way.

EXAMPLE I

Comparative

A mixture of fine lithium aluminate particles, 85 weight percent high surface area (10 m$^2$/g) and 15 weight percent low surface area (1 m$^2$/g), was dispersed in a liquid vehicle containing a mixture of organic solvents and a standard tape casting binder mixture to form a slurry. The slurry was cast to a tape by application to a Teflon surface and smoothing with a doctor blade. The tape was dried resulting in a flat, flexible tape of lithium aluminate particles maintained in tape form by the plastic binder. The tape, about 20 mils thick, was cut into 5 inch square pieces for active electrolyte impregnation.

A 5 inch square piece of lithium aluminate tape was placed on a dense alumina plate and active electrolyte carbonate powder, having the composition 70 mole percent Li$_2$CO$_3$ and 30 mole percent K$_2$CO$_3$, was sprinkled on its upper face. The assembly was heated to 650°

C. over a period of about 5 hours during which the binder in the tape decomposed and vaporized and subsequently the carbonates melted and impregnated the porous matrix.

Figure 3:
FIG. 3 is a photograph after active electrolyte impregnation of a non-toughened lithium aluminate matrix.

FIG. 3 is a photograph of the non-toughened matrix after impregnation showing the badly fractured matrix structure.

EXAMPLE II

Figure 4:
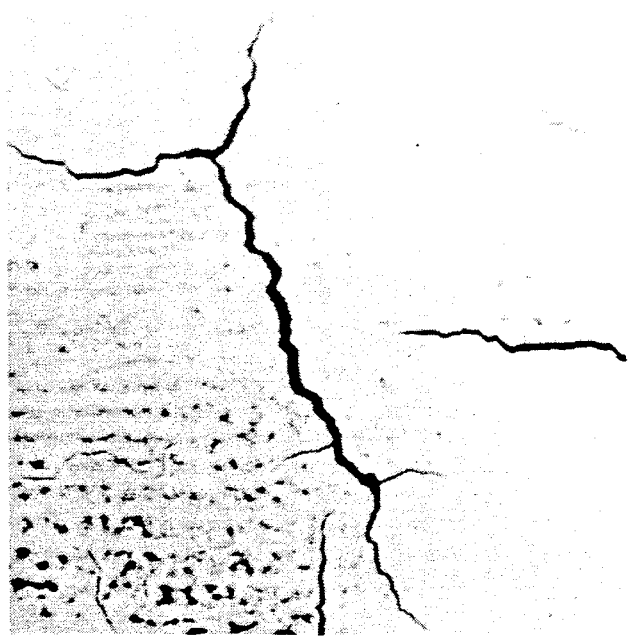
FIG. 4 is a photograph after active electrolyte impregnation of a lithium aluminate matrix toughened with 10 volume percent lithium aluminate fibers.

Electrolyte matrix tapes were prepared of the same materials and as described in Example I except that 10 volume percent Cyprus Foote lithium aluminate fibers, as described above, were added to the dispersed lithium aluminate powder. Active electrolyte carbonates of the same composition as described in Example I were impregnated in a 5" square of the prepared matrix tape in the same manner as described in Example I. FIG. 4 is a photograph of the lithium aluminate fiber toughened matrix after impregnation showing much less severe cracking then the non-toughened matrix shown in FIG. 3.

EXAMPLE III

Figure 5:
FIGS. 5 and 6 are photographs after active electrolyte impregnation of lithium aluminate matrices toughened with 10 volume percent alumina.

Electrolyte matrix tapes were prepared of the same matrix materials as described in Example I except that 10 volume percent Du Pont FP alumina fibers, milled to less than about 200 microns as described above, were added to the dispersed lithium aluminate powder. Active electrolyte carbonates of the same composition as described in Example I were impregnated in a 5" square of the prepared matrix tape in the same manner as described in Example I. FIG. 5 is a photograph of the alumina fiber toughened matrix after impregnation showing hardly visible hairline cracks. Magnification of 40× did confirm the existence of the hairline cracks.

EXAMPLE IV

Figure 6:
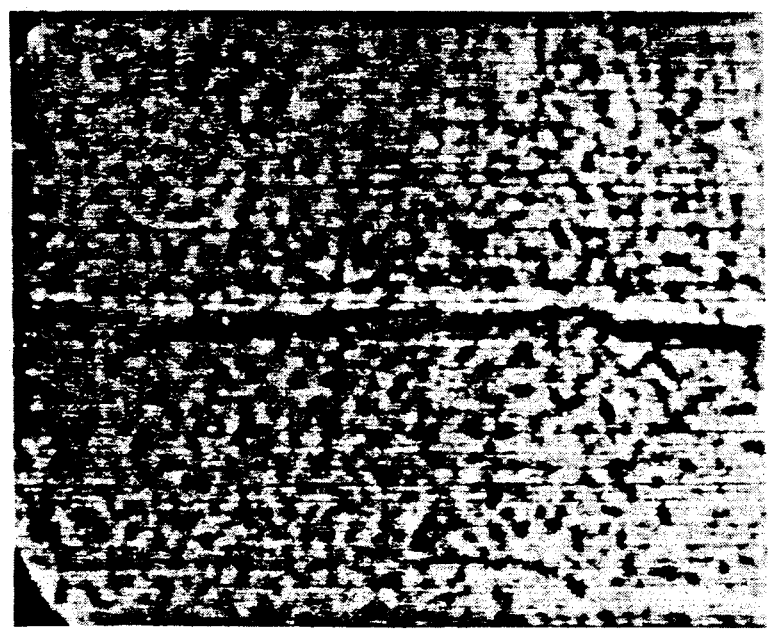

Electrolyte matrix tapes were prepared of the same materials as described in Example I except that 10 volume percent ICI Saffil alumina fibers, as described above were added to the dispersed lithium aluminate powder. Active electrolyte carbonates of the same composition as described in Example I were impregnated in a 5" square of the prepared matrix tape in the same manner as described in Example I. FIG. 6 is a photograph of the alumina fiber toughened matrix after impregnation showing no cracks detected in this structure.

EXAMPLE V

Strength of matrix tape samples, as prepared in Examples I–IV, were performed after decomposing and vaporizing the binder followed by subsequent heating to 1050° C. to increase the strength to a measurable value. However, these strengths are greater than would be measured for the matrix before normal active electrolyte impregnation, but do serve as a measure of comparative strengths of the different matrices. Measurements were made in a biaxial testing rig using samples of disc configuration. Multiple samples of each matrix as prepared in Examples I through IV and an additional matrix the same as prepared in Example IV except with 20 volume percent alumina fibers were tested. Results of the strength measurements are shown in Table 1.

TABLE 1

| Test No. | Fiber Type | Percent | Number Samples | Average Stress (PSI) | Weibull Modulus |
| --- | --- | --- | --- | --- | --- |
| 1 | None | 0 | 19 | 330 | 6 |
| 2 | $LiAlO_2$ | 10 | 20 | 360 | 9 |
| 3 | Alumina FP | 10 | 21 | 470 | 8 |
| 4 | Alumina Saffil | 10 | 23 | 850 | 8 |
| 5 | Alumina Saffil | 20 | 27 | 970 | 8 |

Figure 7:
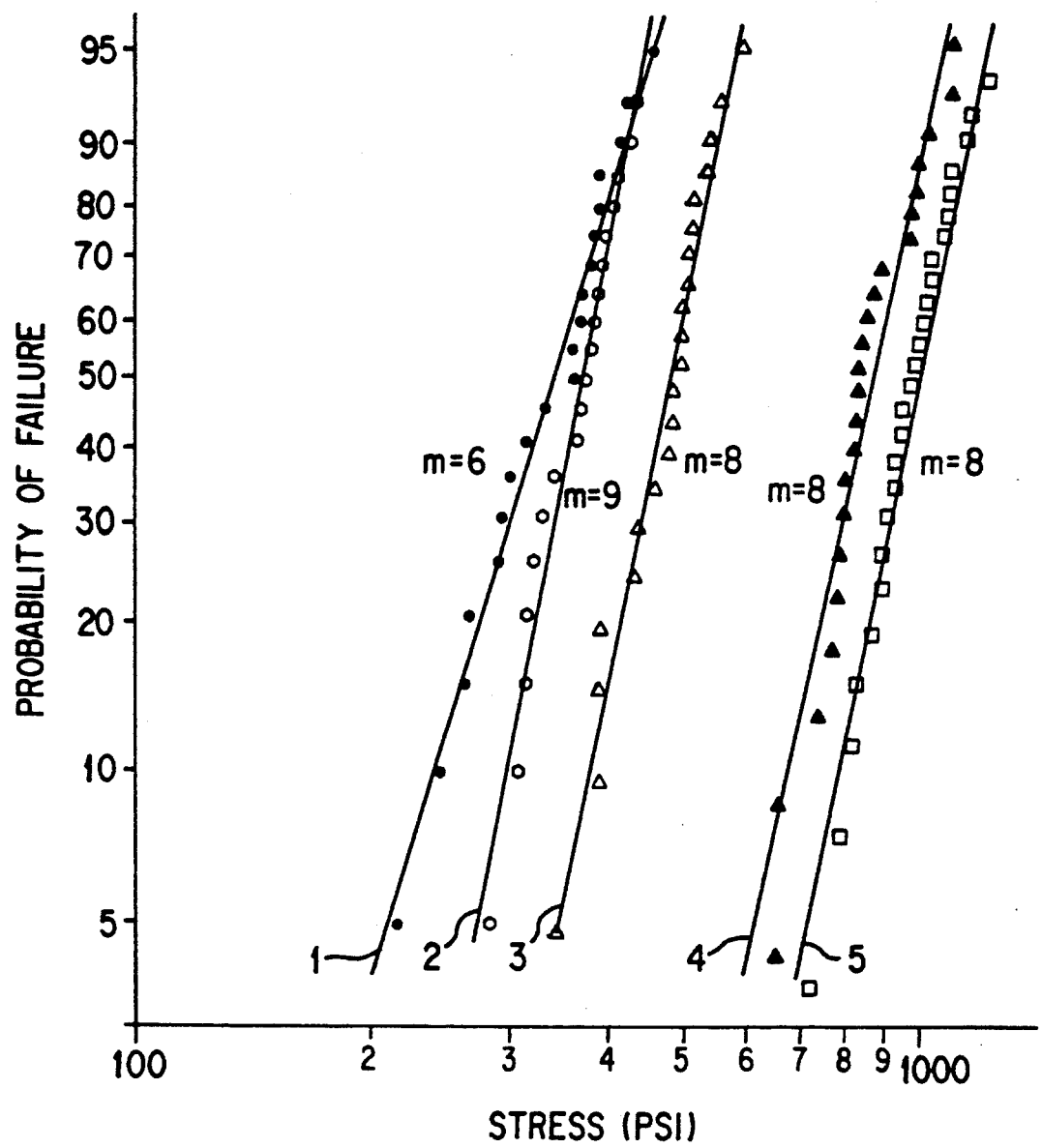
FIG. 7 is a plot of Weibull's modulus for lithium aluminate matrices with and without fiber toughening.

Table 1 clearly shows the strength enhancement of the fiber toughened matrices. Weibull's modulus is a measure of the mechanical reliability of a material obtained by plotting the logarithm of the measured strength against a defined probability of failure. Such a plot is shown in FIG. 7 for the materials shown in Table 1 with Test Numbers of Table 1 identifying the individual plots shown in FIG. 7. Both the strength and the Weibull modulus of the matrices is increased by the fiber toughening.

EXAMPLE VI

Figure 8:
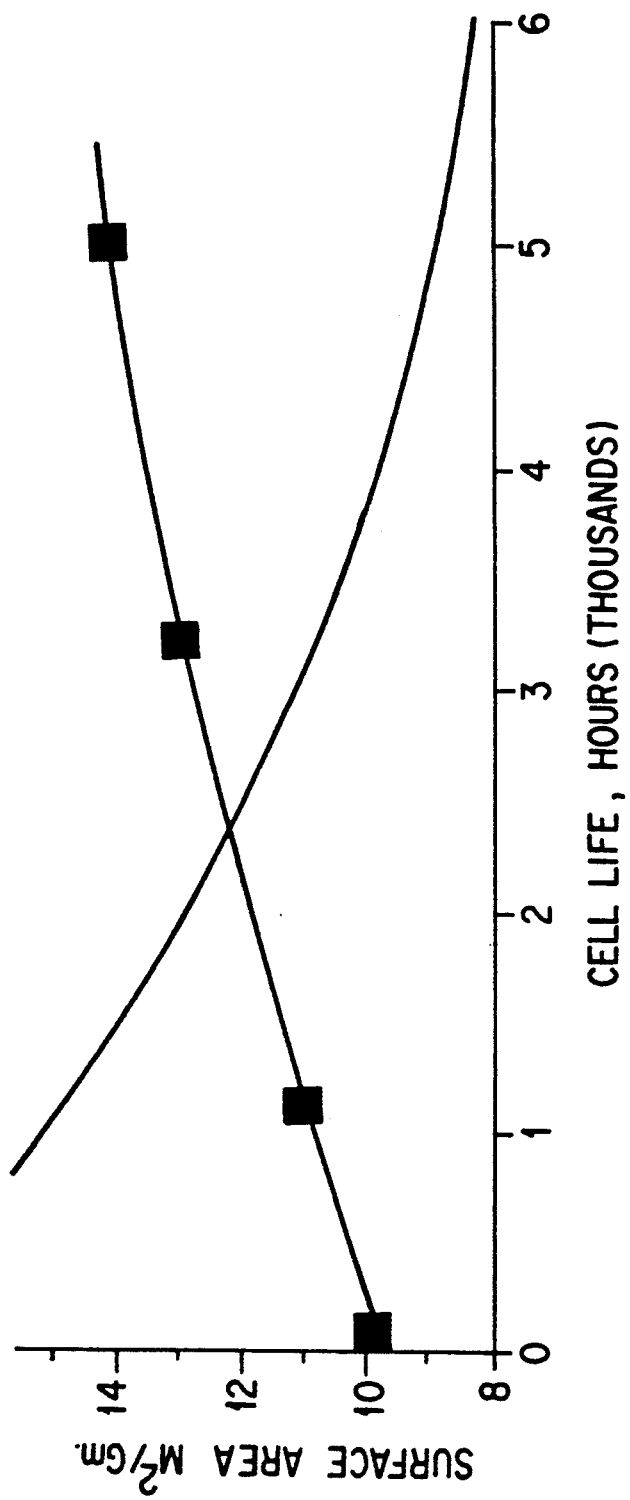
FIG. 8 is a plot comparing lithium aluminate matrix surface area during fuel cell operation of matrices toughened with 10 volume percent alumina fibers with non-toughened hot pressed active electrolyte structures.

Actual fuel cell operational tests were performed using electrolyte matrix tapes as prepared in Example IV except that 100 percent high surface area (10 $m^2/g$) lithium aluminate particles were used in forming the matrix. Binder decomposition and active electrolytes impregnation were carried out in the cell as the cell was heated. Cells were operated for different periods of time and the post cell test matrices were analyzed. Scanning electron microscopy examination suggested that the alumina fibers had formed lithium aluminate and became indistinguishable from the bulk lithium aluminate particles. The carbonates phase of the electrolyte was removed by washing with acetic acid and the surface area of the washed matrix was determined to be increasing with increased cell operation, as shown by the solid line in FIG. 8. The dotted line in FIG. 8 shows, for comparison, the electrolyte matrix surface area decrease in lithium aluminate matrices from hot pressed electrolytes where lithium aluminate powder and active carbonates electrolyte are pressed and heated to the carbonates softening point in a die. It is seen that the alumina fiber toughening of this invention resulted in matrix surface area being increased to about 14 $m^2/g$ in 5,000 hours operation, while the non-toughened hot pressed electrolyte matrix surface area decreased to about 9 $m^2/g$ during the same period of cell operation.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of the invention.

We claim:

1. A porous matrix for molten alkali metal carbonates electrolytes, said matrix comprising lithium aluminate particulates and about 5 to about 50 volume percent, based upon the volume of solids, of electrically nonconductive, active electrolyte compatible fibers having an average diameter of about 1 to about 50 microns and having an average length greater than about 5 times the average diameter.

2. A porous matrix according to claim 1 wherein said fibers comprise about 10 to about 30 volume percent of said porous matrix.

3. A porous matrix according to claim 1 wherein said fibers are about 1 to about 30 microns in diameter.

4. A porous matrix according to claim 1 wherein said fibers have an average length about 10 to 500 times the average diameter.

5. A porous matrix according to claim 1 wherein said fibers have an average length about 40 to 100 times the average diameter.

6. A porous matrix according to claim 1 wherein said fibers are selected from the group consisting of alumina, lithium aluminate and mixtures thereof.

7. A porous matrix according to claim 1 wherein said fibers are principally alpha alumina.

8. A porous matrix according to claim 1 wherein said fibers comprise about 10 to about 30 volume percent of said matrix, are about 1 to about 30 microns in diameter and have a length about 10 to about 500 times said diameter.

9. A porous matrix according to claim 8 wherein said fibers are principally alpha alumina.

10. A process for production of a porous matrix for molten alkali metal carbonates electrolytes comprising; forming a slurry of fine lithium aluminate particles and about 5 to about 50 volume percent, based upon the volume of the solids, electrically non-conductive, active electrolyte compatible fibers having an average diameter of about 1 to about 50 microns and having an average length greater than about 5 times the average diameter in a liquid vehicle comprising organic binder, tape casting said slurry, and heating to vaporize said vehicle and decompose and vaporize said binder.

11. A process according to claim 10 wherein said fibers comprise about 10 to about 30 volume percent of said porous matrix.

12. A process according to claim 10 wherein said fibers are about 1 to about 30 microns in diameter.

13. A process according to claim 10 wherein said fibers have an average length about 10 to about 500 times the average diameter.

14. A process according to claim 10 wherein said fibers have an average length about 40 to about 100 times the average diameter.

15. A process according to claim 10 wherein said fibers are selected from the group consisting of alumina, lithium aluminate and mixtures thereof.

16. A process according to claim 10 wherein said fibers comprise about 10 to about 30 volume percent of said matrix, are about 1 to about 30 microns in diameter and have a length about 10 to about 500 times said diameter.

17. A process for reducing cracking of tape cast electrolyte matrix during loading of said matrix with active molten carbonates electrolyte comprising; incorporating into the slurry for tape casting said matrix about 5 to about 50 volume percent, based upon the volume of the solids, electrically non-conductive, active electrolyte compatible fibers having an average diameter of about 1 to about 50 microns and having an average length greater than about 5 times the average diameter.

18. A process for reducing cracking of tape cast electrolyte matrix according to claim 17 wherein said fibers comprise about 10 to about 30 volume percent of said matrix, are about 1 to about 30 microns in diameter and have a length about 10 to about 500 times said diameter.

19. A process for reducing cracking of tape cast electrolyte matrix according to claim 18 wherein said fibers are selected from the group consisting of alumina, lithium aluminate and mixtures thereof.

20. A process for preventing decrease in surface area of electrolyte matrix during molten alkali metal carbonates fuel cell operation comprising; incorporating into the slurry for tape casting said matrix about 5 to about 50 volume percent, based upon the volume of the solids, electrically non-conductive, active electrolyte compatible fibers having an average diameter of about 1 to about 50 microns and having an average length greater than about 5 times the average diameter.

21. A process for preventing decrease in surface area of electrolyte matrix according to claim 20 wherein said fibers comprise about 10 to about 30 volume percent of said matrix, are about 1 to about 30 microns in diameter and have a length about 10 to about 500 times said diameter.

22. A process for preventing decrease in surface area of electrolyte matrix according to claim 21 wherein said fibers are selected from the group consisting of alumina, lithium aluminate and mixtures thereof.

* * * * *